United States Patent [19]

Kamaei et al.

[11] Patent Number: 4,994,335

[45] Date of Patent: Feb. 19, 1991

[54] MICROPOROUS FILM, BATTERY SEPARATOR EMPLOYING THE SAME, AND METHOD OF PRODUCING THEM

[75] Inventors: Eiichi Kamei, Osaka; Hidetomo Ashitaka; Toru Takahashi, both of Ichihara, all of Japan

[73] Assignee: Ube Industries, Ltd., Yamaguchi, Japan

[21] Appl. No.: 404,382

[22] Filed: Sep. 8, 1989

[30] Foreign Application Priority Data

Sep. 10, 1988 [JP] Japan .............................. 63-226882
Sep. 26, 1988 [JP] Japan .............................. 63-240441

[51] Int. Cl.$^5$ ............................................. H01M 2/16
[52] U.S. Cl. .................................. 429/254; 161/159; 264/210.4
[58] Field of Search ................. 429/194, 254; 161/159

[56] References Cited

U.S. PATENT DOCUMENTS

| | | | |
|---|---|---|---|
| 3,426,754 | 2/1969 | Bierenbaum et al. | 128/156 |
| 3,558,764 | 1/1971 | Isaacson et al. | 264/210 |
| 3,679,538 | 7/1972 | Druin et al. | 161/159 |
| 3,801,404 | 4/1974 | Druin et al. | 156/229 |
| 3,801,692 | 4/1974 | Zimmerman | 264/210 R |
| 3,843,761 | 10/1974 | Bierenbaum et al. | 264/210 R |
| 4,138,459 | 2/1979 | Brazinsky et al. | 264/154 |
| 4,735,875 | 4/1988 | Anderman et al. | 429/194 |
| 4,791,144 | 12/1988 | Nagou et al. | 429/254 |

Primary Examiner—Donald L. Walton

[57] ABSTRACT

This microporous film has an approximately uniform configuration in which the intervals between slender fibrils extend approximately two-dimensionally which are connected to each other between adjacent unstretched planar flat portions to define fine throughpores, and the distribution of pore size is sharp and the porosity is high. Accordingly, the microporous film excels in water filtration rate and selective separating capability and is suitable for use as filter membrane, separator membrane, gas exchange membrane, and a battery separator.

3 Claims, 2 Drawing Sheets

MICROPOROUS FILM, BATTERY SEPARATOR EMPLOYING THE SAME, AND METHOD OF PRODUCING THEM

BACKGROUND OF THE INVENTION AND RELATED ART STATEMENT

The present invention relates to a polyolefin microporous film having a multiplicity of fine through-pores formed by a stretching method, a battery separator employing an improved porous polypropylene film, and a method of producing them.

Microporous film of the type which is composed of film made of polymeric material and a multiplicity of fine through-holes formed therein are used for various applications in the fields of, for example, filter membrane or separator membrane for use in air purification, water treatment or the like, a separator for use in a battery or in electrolysis, gas exchange membrane or separator membrane for use in artificial lungs or in plasma separation, and filter membrane or separator membrane for use in sterilization and refinement of various kinds of enzyme for production of hard or soft drinks such as beer or sake on draft or fresh juice.

A known method of producing a microporous film having a multiplicity of fine through-pores comprises the steps of dispersing, for example, an easily soluble substance in a polymeric material, forming the polymeric material mixed with this substance into film, and eliminating the easily soluble substance by dissolving it with a solvent, thereby forming a multiplicity of fine pores in the film.

In recent years, another method of producing a porous body has been generally accepted. This method utilizes a method which comprises the steps of forming thermoplastic crystalline polymer material into a film, then subjecting the film to heat treatment, and subsequently forming pores in the film by a stretching step.

As is known, various kinds of polymeric material can be employed as a thermoplastic crystalline polymer material suitable for the above-described purposes. Among others, polyolefin, particularly polypropylene, is inexpensive and excels in strength and chemical resistance and is therefore regarded as an excellent polymeric material suitable for use in producing a microporous film.

A method of producing a microporous film by stretching a crystalline polyolefin film and forming pores in the film is disclosed in, for example, U.S. Pat. Nos. 3,426,754; 3,558,764; 3,679,538; 3,801,404; 3,801,692; 3,843,761 and 4,138,459. In these method, a film having pores connected to each other therein and having an average pore size of 1,000-2,000Å can be obtained. Similar methods of producing a microporous film are disclosed in Japanese Patent Publication Nos. 46-40119, 50-2176 and 55-32531. The gist of these prior arts resides in a method which comprises the steps of subjecting an unstretched film to heat treatment, stretching the film at a temperature close to room temperature or a temperature in the range of between a temperature not lower than the second order transition temperature of the resin (for example, a temperature not lower than −40° C. in the case of polypropylene) and a temperature not higher than the temperature at which the partial melting of the crystalline phase begins to occur. Thereby generating pores and forming a porous body, then stretching at a temperature in the range of between a temperature higher than the temperature at which the partial melting of the phase begins to occur and a temperature not higher than the crystalline melting point, and again conducting heat treatment to thermally fix the pores thus formed.

However, in the conventionally known microporous film produced by the stretching process, the pores are defined by relatively thick portions of nonuniform sizes and configurations which form meshes of various sizes and meandering shapes and fine fibrils which run in these meshes in the direction approximately parallel to the direction in which the film is stretched. Accordingly, the configurations and sizes of the pores are nonuniform and the porosity is low. In addition, since the meandering portions form continuous closed circuits of various sizes, the longitudinal lengths of the pores which extend through the film from one to the other surface are excessively long. Accordingly, if the microporous film obtained by the prior art is used for plasma separation, the plasma filtration rate is low and the selective separating capability is inferior.

A nonwoven fabric of synthetic resin or a nonwoven fabric of glass fiber is generally employed as a battery separator. In recent years, electronic devices have been made portable or even smaller in size, weight or thickness, and various kinds of card-like electronic devices have been being developed. In such a situation, in the field of batteries for use as the electrical power sources of such electronic devices, a demand has arisen for an increase in the energy density and a reduction in the thickness of the battery. One method for meeting the demand is to improve a separator which is one element of a battery. More specifically, a method for using a porous film as a battery separator is proposed in order to answer the demand for an improvement in battery performance and a reduction in the thickness of the battery based on an increase in the amount of active material enclosed or a reduction in internal resistance. For example, Japanese Patent Laid-Open Nos. 62-222562 and 63-126159 disclose a method of preparing a separator by impregnating a porous polypropylene film with a liquid electrolyte or a semi-solid electrolyte.

The porosity of porous polypropylene film which has heretofore been used is at most 45% or thereabouts. As described above, typical methods of producing conventional porous polypropylene film are disclosed in Japanese Patent Publication Nos. 46-40119, 50-2176 and 55-32531. The porous polypropylene films obtained in these methods, however, present a number of problems. For example, since the porosity is low, electrolyte cannot be sufficiently retained and an area which allows ionic conduction is limited. In addition, since the overall path lengths of the pores from one surface of film to opposite side of film are excessively long and the substantial distance between the electrodes is large, the internal resistance increases. If a separator made from such a film is used in a battery, the performance of the battery will be low.

If one intends to increase the aforesaid porosity with the prior art method of producing a porous polypropylene film, porosity will not increase beyond some limiting value being less than about 55%, and nonuniform pores will be formed in the film. If such a film is used as a separator, fine powder in an active material of either electrode may pass through the separator and contact the other electrode, thus resulting in a deterioration in the battery performance.

OBJECTS AND SUMMARY OF THE INVENTION

It is, therefore, an object of the present invention to provide a polypropylene microporous film which is capable of solving the above-described disadvantages and a method of producing the polypropylene microporous film.

It is another object of the present invention to provide a battery separator which excels in characteristics such as ionic conductivity and a lithium battery employing such a separator.

To achieve the above objects, the present inventors conducted intensive researches and succeeded in forming a microporous film having a remarkably unique structure, that is, a microporous film having a sharp distribution of pore sizes, high porosity, and fine through-pores each of which extends approximately two-dimensionally perpendicularly to the direction of film stretching, by stretching an unstretched polyolefin film which has a specific crystallinity, small-angle X-ray scattering diffraction images consisting of two-point figures, a specific magnitude of diffraction angle at the degree of diffraction which is equivalent to ½ of the maximum degree of diffraction of each of the figures (hereinafter referred to as a "half-value width of a diffraction degree"), and a specific long period.

More specifically, in accordance with one aspect of the present invention, there is provided a microporous film having a multiplicity of fine through-pores obtained by stretching a polyolefin film, which film comprises groups of unstretched planar flat portions which run at approximately constant intervals in the direction perpendicular to the direction in which the film is stretched and which are formed approximately parallel to a cross section perpendicular to the direction in which the film is stretched; and groups of relatively slender fibrils which run in the gap between adjacent planar flat portions at approximately constant intervals and approximately in parallel with the direction in which the film is stretched, both groups being combined to define a multiplicity of fine pores each of which has an approximately uniform configuration in which the intervals between the slender fibrils connecting adjacent planar flat portions extend approximately two-dimensionally.

In accordance with another aspect of the present invention, there is provided a separator for a battery which is made from a microporous film whose polyolefin film is a porous polypropylene film in which a majority of pores are through-pores and have approximately uniform pore sizes, the porosity of the film being not lower than 45%. There is also provided a lithium battery employing this battery separator.

In accordance with still another aspect of the present invention, there are provided several methods of producing the microporous film described above. The first method comprises the steps of preparing an unstretched polyolefin film, such as an unstretched polypropylene film, whose crystallinity is 50–90%, whose diffraction images obtained by small angle X-ray scattering are two-point figures each having an approximately circular form, the half-value width of the maximum degree of diffraction of each of the figures being not greater than 15', the long period being not smaller than 120Å, and stretching the unstretched film in a medium selected from the group consisting of nitrogen, oxygen, argon, carbon monoxide, methane and ethane at a stretching temperature which is not higher than −70° C. and which is in the low-temperature range from the solidifying point of the medium to a temperature which is 50° C. higher than the boiling point of the medium. The second method comprises the steps of preparing the above-described unstretched film, and stretching the unstretched film at a strain rate corresponding to a strain rate of less than 10%/min. in the lowest temperature within a temperature range which is 10–60° C. lower than the melting point of the polyolefin employed, without any prestretching step at room temperature. In the third method, an unstretched polypropylene film is subjected to a stretching process based on the second method at a stretching temperature which is in the high-temperature range of 110 to 155° C.

In accordance with a further aspect of the present invention, there is provided a method of producing a separator for use in a battery. This method is substantially identical to any of the above-described methods of producing microporous film except that it is not necessary to specify the kind and the characteristics of unstretched polypropylene film to be employed.

The above and other objects, features and advantages of the present invention will become apparent from the following description of the preferred embodiments thereof, taken in conjunction with the accompanying drawings.

DETAILED DESCRIPTION OF THE INVENTION

Figure 1:
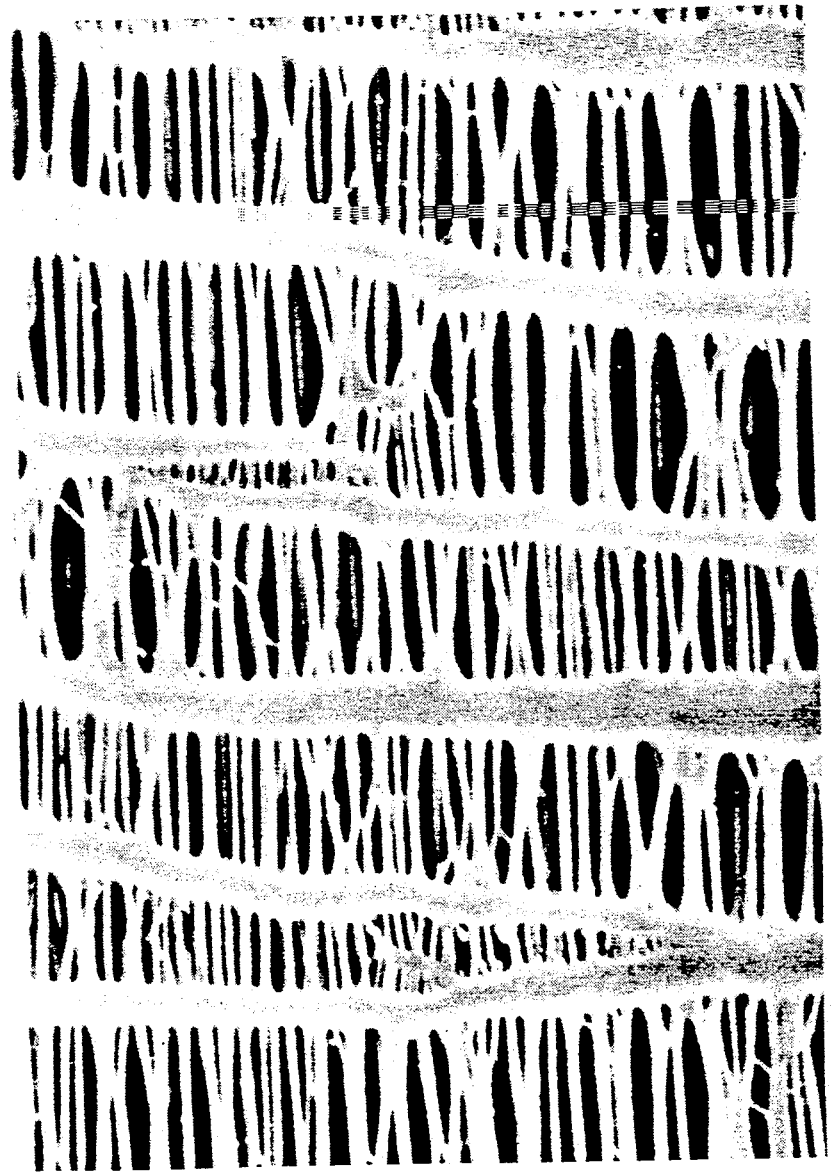
FIG. 1 is an scanning electron micrograph illustrating the configuration of fine fibrils which form a portion of the surface of a microporous film according to the present invention.

In a microporous polyolefin film obtained by a conventionally known method, for example, a film obtained by the method disclosed in Japanese Patent Publication No. 46-40119, relatively thick portions are present in a meandering state and form closed circuits of various sizes which may be regarded as cells, and fine fibrils are connected to each other in each of the closed circuits to define a multiplicity of pores.

The present inventors carefully examined various forming conditions and developed a film in which these relatively thick portions were formed solely in the direction approximately perpendicular to the direction in which the film was designed to be stretched, that is to say, a special microporous film in which relatively thick portions of an unstretched planar flat shape had a multiplicity of fine pores formed in the direction in which the film was stretched.

In other words, it may be said that the microporous film of the present invention has an approximately uniform configuration in which the gaps, which constitute the pores, between the fine fibrils connected between adjacent unstretched planar flat portions extend approximately two-dimensionally.

The phrase "to extend approximately two-dimensionally" means that the pores in the microporous film of the present invention extend from one to the other surface of the film approximately rectilinearly or in a slightly meandering state in the rightward and leftward directions between two adjacent unstretched planar flat portions within the film. This configuration differs from the conventionally known configuration in which the pores in a microporous film extend from one to the other surface of the film while meandering therein in all directions in a confused way.

That is to say, the film provided in accordance with the present invention is a microporous film which overcomes the disadvantages of the film provided by the conventionally known method. Such a microporous film has pores of uniform configuration and size, as well as increased porosity with the strength maintained, and the longitudinal size of each pore is reduced.

In the present invention, groups of unstretched planar flat portions do not form closed circuits over the length of three time or more, preferably five times or more, more preferably ten times or more, the average length ($\bar{d}$) of the fine fibrils. The average length ($\bar{d}$) of the fine fibrils is given by selecting an arbitrary fibril which connects arbitrary adjacent planar flat portions of the above-described ones and obtaining the average length of twenty fibrils which include the arbitrarily selected fibril and fibrils disposed therearound.

In the present invention, the thickness ($\Delta d$) of each planar flat portion which is formed perpendicularly to the direction in which the film is stretched is preferably in the range of 0.1 to 40 $\mu$m, and it is desirable that the following relationship hold between the thickness ($\Delta d$) of the flat portion and the thickness ($\Delta \lambda$) of the fine fibril:

$$3\Delta\lambda \leq \Delta d \leq 400\Delta\lambda$$

If $\Delta d$ is smaller than 3 $\Delta\lambda$, the strength is insufficient, while if $\Delta d$ is larger than 400 $\Delta\lambda$, the porosity declines and the filtration rate decreases. If the microporous film according to the present invention is to be employed as a plasma separator membrane, it is preferable that the $\bar{d}/\bar{l}$ ratio of the average length ($\bar{d}$) of the fibrils to the average interval ($\bar{l}$) between the fibrils be in the range of 2 to 60 with $\bar{l}$ being 0.02-2 $\mu$m.

As for the density of the fine fibrils described above, if it is assumed that, on either of the surfaces of the microporous film of the present invention, a length equal to the average length ($\bar{d}$) of the fibrils is measured from one starting point selected in the cross-section of the aforesaid planar flat portion which extends parallel to the direction in which the film is stretched, it is preferable that three to thirty fine fibrils be present within the area defined by the length.

As for the physical properties of the film according to the present invention, the porosity is 30–85%, preferably 50–85%, the average pore size 0.02–2 $\mu$m, preferably 0.04–1.5 $\mu$m, the ratio $D_A/D_M$ of an average pore size ($D_A$) to a maximum pore size ($D_M$) 0.5–1.0, preferably 0.6–1.0, the tensile elastic modulus measured in the stretching direction 5,000 kg/cm$^2$ or more, preferably 6,000 kg/cm$^2$ or more.

If the polyolefin microporous film of the present invention having the above-described features is used as a filter membrane, no deterioration in the filtration rate or the separating capability occurs over a long period of time. In addition, such a film has an interesting feature in that if it is used for plasma separation, it does not cause any hemolyzation at a filtration pressure below about 150 mmHg. If the film is used as a separator in a battery, the movement of ions is facilitated and various kinds of electrolyte can be used in accordance with the kind and configuration of the battery. It is also possible to cut the separator into various configurations.

An example of the construction of a lithium battery employing a battery separator made from a porous polypropylene film which is one example of the polyolefin microporous film of the present invention is illustrated hereinbelow. Incidentally, the kinds of constituent materials are not limited to those in the following examples.

As an electrolyte diaphragm, the aforesaid porous polypropylene film which is impregnated with a liquid electrolyte or a gelatinized electrolyte is employed. As the liquid electrolyte, a nonaqueous solvent in which lithium ion salt is dissolved is employed.

Typical examples of the nonaqueous solvent are propylene carbonate, $\gamma$-butyrolactone, dimethoxyethane, dioxolane, tetrahydrofuran, dimethyl sulfoxide, ethylene carbonate, acetonitrile, sulfolane, low molecular weight liquid polyethylene oxide, and compounds alkyl ether group in the terminal portion thereof. These materials may be used in a mixed form.

Typical examples of lithium ion salt are LiClO$_4$, LiB(C$_6$H$_5$)$_4$, LiCF$_3$SO$_3$, LiPF$_6$. These materials may be used in a mixed form.

The gelatinized electrolyte is obtained by mixing the aforesaid liquid electrolyte with a polymeric material and gelatinizing the mixture. Typical examples of the polymeric materials are polyethylene oxide, polymethacrylate, a polymer of acryloyl denatured polyethylene oxide, polyvinylidene fluoride, polyvinyl methylether, polyacrylonitrile or copolymers thereof.

Typical examples of active materials used as the anode are lithium and a lithium alloy such as an alloy of lithium, aluminum, mercury, zinc, etc.

Typical examples of active material used as the cathode are manganese dioxide, molybdenum trioxide, vanadium pentoxide, titanium, niobium sulfide, chromium oxide, and copper oxide. Carbon black as an electrical conducting material and, if necessary, a binder such as polytetrafluoroethylene are mixed with such an active material and the mixture obtained is formed under pressure to prepare an cathode layer.

This type of battery separator is produced from a microporous polypropylene film, and therefore excels in chemical resistance. Accordingly, the battery separator can be adapted to a wide range of applications, such as an alkaline battery and a lithium battery. In addition, the battery separator can be cut into various forms in accordance with the configuration of a battery in which it is to be used. The battery separator impregnated with a liquid electrolyte, a gelatinized electrolyte, a solid polymeric electrolyte and the like are interposed between anode and cathode of the battery, thereby realizing the function of preventing short-circuiting from occurring between both electrodes as well as the function of ionic conduction.

As compared with the conventional porous polypropylene film, the porous polypropylene film according to the present invention has a high porosity, a uniform pore configuration, an increased number of through-pores, and a uniform pore size. Accordingly, the porous polypropylene film of the present invention excels in the above-described functions.

If the porosity of the film is less than 45%, the ionic permeability falls and the internal resistance increases. If the porosity is increased in the conventional production method, the pore size becomes nonuniform. However, as in the case of the porous polypropylene film of the present invention, even if the porosity is increased, the uniformity of the pore size is maintained and an excellent separator function can be achieved.

A method of producing microporous film in accordance with the present invention will be described in detail below.

For the polyolefins useful in producing the microporous film of the present invention, high-density polyethylene, polypropylene and poly (4-methylpentene-1), for example, can be used. Polypropylene is particularly preferred, and the kind of polypropylene to be used is not limited to any particular one. Not only a polymer consisting of propylene but a random, block or graft copolymer of propylene and other monomer or an oligomer may be employed. (In the description of the present invention, if the term "polypropylene" is used with no specific definition, it is the general term for the above-described polymer and copolymer.) Materials usable as the monomer or oligomer described above may be of any type that can be copolymerized and, for example, ethylene or an oligomer derived from ethylene may be used.

The melt viscosity [melt flow index (MFI) or melt index (MI)] of polyolefin to be employed is not particularly limited to a range within which formation of the film is allowed. As an example, if the formability or productivity of film is taken into account, it is preferable to use polypropylene of a type whose MFI is 0.5–40 g/10 min.

Polyolefin including additives such as a plasticizer, a colorant, a flame retardant and a filler may be employed in place of the above polypropylene.

In the present invention, an unstretched polyolefin film is prepared by effecting formation based on a known film producing method. Typical examples of usable film producing methods are an inflation film forming method and a T die film forming method. The forming conditions of such a forming method can be freely selected in accordance with which of the known forming methods is used. For example, the film-forming temperature may be selected from among temperatures which are not lower than a temperature at which the polyolefin employed can be delivered and which are not higher than a temperature at which thermal decomposition of the polyolefin occurs. If polypropylene is used as polyolefin, the film-forming temperature is normally 170–300° C., preferably 190–270° C.; in the case of high-density polyethylene, normally 150–300° C., preferably 160–270° C.; and in the case of poly (4-methylpentene-1), normally 260–330° C., preferably 270–300° C.

Moreover, the elastic recovery of the unstretched polyolefin film obtained by the above-described formation, for example, that of an unstretched polypropylene film, is not specifically limited. However, in the case of an unstretched polypropylene film whose elastic recovery is zero % or extremely close thereto, that is, the extent of crystalline orientation of which is extremely small, even if such an unstretched polypropylene film is subjected to a stretching step of the present invention, it is difficult to obtain microporous film having a distinct pore structure which can be achieved in accordance with the present invention. Accordingly, it is desirable to set the forming conditions of unstretched film while taking account of characteristics such as the porosity of the desired porous polypropylene film and the average pore size of the fine pores.

As described above, the elastic recovery of unstretched polypropylene film is not particularly limited, but, for the above-described reasons, it is desirable for the elastic recovery of unstretched polypropylene film from a 50% stretched state thereof at a 25° C. with a relative humidity of 65% to be set to 20% or more. Moreover, if productivity which may result from the use of an ordinary forming apparatus is taken into account, it is particularly preferable that the elastic recovery range from 30 to 95%.

Elastic recovery (%)=[length of stretched film − length of film recovered after having been subjected to the stretching]/[length of stretched film − length of film before being subjected to the stretching]×100

Moreover, on condition that the above requirements and other primary factors such as productivity be taken account of, the draft ratio (the ratio of the take-up speed of unstretched thermoplastic resin film to the speed of delivery from a die : the ratio of take-up speed to delivery speed) of unstretched polypropylene film according to the present invention will preferably be in the range of 10–6,000 in terms of productivity. In addition, it is necessary to form film while sufficiently considering the kind of cooling medium, the time and distance required for delivered resin to make contact with the coolant medium, the temperature of the resin during this step, and the like, because a value of elastic recovery of unstretched film strongly depends upon cooling condition during film forming, even if a draft ratio is the same.

The unstretched polyolefin film thus obtained may be subjected to heat treatment prior to a stretching step since the crystallinity of the unstretched polyolefin film can be enhanced by applying the heat treatment before the stretching step, the characteristics of the microporous film obtained by stretching are further improved. The heat treatment is carried out by using, for example, a method in which unstretched polyolefin film is heated for 3 seconds or more in air heated to a temperature which is lower than the melting point of polyolefin by 15–70° C.

Unstretched polyolefin film which can be suitably subjected to the stretching step according to the present invention is of a type whose crystallinity is 50–90%, preferably 60–90%, whose diffraction images obtained by small angle X-ray scattering are two-point figures each having an approximately circular form, the half-value width of the maximum degree of diffraction of each of the figures being 15' or less, preferably 12' or less with the long period 120Å or more, preferably 150 Å or more.

The stretching step according to the present invention is selected from among the following methods.

1) The stretching step is effected in a medium selected from the group consisting of nitrogen, oxygen, argon, carbon monoxide, methane and ethane at a stretching temperature of −70° C. or below and within the low-temperature range from the solidifying point of the medium to a temperature which is 50° higher than the boiling point of the same. Alternatively, 2) The stretching step is effected at a strain rate corresponding to a strain rate of less than 10%/min. in the lowest temperature within a temperature range which is 10–60° C. lower than the melting point of the polyolefin employed, without any pre-stretching step at room temperature.

If polypropylene used as polyolefin is to be stretched by method 2), it is preferable that the range of stretching temperatures be 110-155° C.

First of all, method 1) is described below.

In the extremely low temperature stretching step according to method 1), the aforesaid media may be used independently or in a mixed form.

Examples of stretching temperatures suitable for use of the above media are −209 to −146° C. with respect to nitrogen, −218 to −132° C. with respect to oxygen, −189 to −140° C. with respect to argon, −205 to −141° C. with respect to carbon monoxide, −182 to −111° C. with respect to methane, −183 to −70° C. with respect to ethane. If the stretching temperature is higher than −70° C., the percentage of available pores which can be formed by stretching, for example, an unstretched film of low elastic recovery becomes low. In method 1), the temperature range not higher than a temperature which is 50° C. higher than the boiling point does not mean a temperature range which is lower than a temperature range which is accurately 50° C. higher than the boiling point, but means a temperature range not higher than a temperature which is approximately 50° C. higher than the boiling point.

Under such extremely low temperature conditions, any of the aforesaid media assumes a liquid state, a liquid gas state, or a gas state. However, the above-described stretching step can be effected no matter which state the medium assumes.

It is presumed that the above-described stretching according to the present invention is brought about as the result of crazing caused by stretching in the aforesaid medium at such extremely low temperatures. The number of crazes generating in this stretching step increases with increasing strain rate, but the depth of crazes decreases with increasing strain rate. Namely this fact means that an adequate strain rate must be selected depending upon the thickness of unstretched film in order to get a film with through-pores. In the ordinary media other than the aforesaid media, a polyolefin film assumes a glass state under extremely low temperature conditions and is therefore cut with no extension appearing by stretching. Accordingly, no crazing occurs.

The extremely low temperature stretching of the present invention can be implemented in a temperature range from the solidifying point of the medium employed to a temperature not higher than a temperature which is 50° C. higher than the boiling point. In general, it is advantageous to effect stretching at temperatures close to the boiling point of the low temperature liquid from the viewpoints of production control, as well as in order to keep constant the characteristics of the polyolefin microporous film to be produced.

The percentage of stretching in the above-described extremely low temperature stretching step is generally in the range of 1 to 200% with respect to the initial length of the unstretched polyolefin film. However, the suitable percentage of stretching is in the range of 10 to 150%. Within the percentage of stretching described above, as the percentage of stretching increases, the number of pores and the porosity tend to increase, respectively. If this tendency is utilized, the average pore size or porosity of polyolefin microporous film to be produced can be adjusted for specific purposes.

The above-described extremely low temperature stretching step may be repeated by two times or more until the desired pore structure, the desired average pore size, the desired porosity and the desired mechanical properties are obtained.

Unlike the conventional process utilizing a stretching step in the vicinity of room temperature, the present inventive process of making porous a polyolefin film such as a polypropylene film in the above-described specific medium by utilizing a stretching step under cooling conditions at extremely low temperatures can also be effectively applied to a polypropylene film whose elastic recovery from a 50% strain at 25° C. is less than 40%. Accordingly, it is possible to produce a polyolefin microporous film such as an excellent porous polypropylene film which has uniform pores and high porosity.

The polyolefin film which has been made porous through the extremely low temperature stretching step in the aforesaid specific medium is then preferably subjected to heat fixation. The primary object of this heat fixation is to thermally fix the film so as to retain the fine pores thus formed. The heat fixation is implemented by using a method of heating a polyolefin film, which has been made porous while maintaining the stretched state at extremely low temperatures, for 3 seconds or more in air which is heated to a temperature which is 5-60° C. lower than the melting temperature of the polyolefin employed. In the method of heating a polyolefin film in heated air for 3 seconds or more, specific examples of the heating temperatures are: with respect to polypropylene, normally 110-165° C., preferably 130-155° C.; with respect to high-density polyethylene, normally 70-125° C., preferably 80-120° C.; and with respect to poly (4-methylpentene-1), normally 150-210° C., preferably 160-200° C. If the heating temperature of a particular material is remarkably higher than the upper limit of the temperature described above, the formed fine pores may be closed. If the heating temperature is remarkably lower than the lower limit, or if the heating period is shorter than 3 seconds, insufficient heat fixation results and the formed pores may be closed at a later time. Moreover, the film may be susceptible to heat shrinkage due to temperature changes during use. The above-described extremely low temperature stretching and heat fixation can be repeatedly conducted until the desired average pore size and porosity are obtained. In other words, a process comprising the steps of changing the temperature of the film to room temperature and subjecting the film to the extremely low temperature stretching (and heat fixation) can be carried out repeatedly. If the extremely low temperature stretching is conducted repeatedly, the number of pores to be formed can be increased and the porosity and the average pore size can also be increased.

The polyolefin microporous film, such as a porous polypropylene film, prepared in the above-described manner exhibit good characteristics since the average pore size is large and the porosity is high. If such a polyolefin microporous film is subjected to a heat stretching step, its characteristics will be further improved.

The heat stretching step to be applied to the polyolefin film which has been made porous through at least one cycle of the aforesaid extremely low temperature stretching step is implemented in the following manner. The primary object of this heat stretching step is to enlarge the pore size of fine pores which have been formed at extremely low temperatures. This heat stretching step is implemented by using a method of stretching a porous polyolefin film in air heated to a temperature which is 90–5° C. lower than the melting temperature of the polyolefin employed. The heat stretching step is implemented by effecting stretching in air which is heated to, for example, normally 80–160° C., preferably 110–155° C. with respect to a polypropylene film; normally 70–125° C., preferably 80–120° C. with respect to high-density polyethylene; and normally 150–210° C., preferably 160–200° C. with respect to poly (4-methylpentene-1). If the heating temperature of a particular material is higher than the upper limit of the aforesaid temperature, the formed fine pores may be closed. If the heating temperature is lower than the lower limit, a sufficient degree of enlargement of the pore size may not be obtained by stretching.

The percentage of stretching in the above-described heat stretching step is normally 10–700%, preferably 50–550% with respect to the length of a film before the extremely low temperature stretching step (the initial length). If the percentage of stretching is lower than 10%, the degree of enlargement of the pore size is insufficient. If it is higher than 700%, the film may break off.

This heat stretching step and the aforesaid extremely low temperature stretching step may be conducted alternately, or the heat stretching step may be conducted after one cycle of extremely low temperature stretching step has been completed.

It is desirable that the film which has been made porous by the aforesaid stretching step be subjected to heat fixation at the interval between this stretching step and the next stretching step. The primary object of the heat fixation step is to thermally fix the film so as to retain the pores formed in the heat stretching step.

This heat fixation step is generally implemented by using a method of heating a polyolefin film which as been made porous, at a temperature which is 5–60° C. lower than the melting temperature of the polyolefin employed, in air for 3 seconds or more with its stretched state maintained. Specific examples of the heating temperature are: with respect to polypropylene, normally 100–165° C., preferably 130–155° C.; with respect to high-density polyethylene, normally 70–125° C., preferably 80–120° C.; and with respect to poly (4-methylpentene-1), normally 150–210° C., preferably 160–200° C.

It is desirable that this heat fixation be similarly effected with respect to a film which has been passed through all the stretching steps.

If the heating temperature of a particular material is higher than the upper limit of the aforesaid temperature, the formed pores may be closed. If the heating temperature is lower than the lower limit, or if the heating period is shorter than 3 seconds, insufficient heat fixation results and the formed pores may be closed at a later time. Moreover, the film may be susceptible to heat shrinkage due to temperature changes during use.

The stretching method 2) according to the present invention will be explained below.

The stretching step in this method 2) is conducted at a strain rate corresponding to a strain rate of less than 10%/min. in the lowest temperature within a temperature range which is 10–60° C. lower than the melting temperature of polyolefin, preferably a temperature range which is 20–60° C. lower than the same. For example, the stretching step is conducted at the strain rate corresponding to the strain rate of less than 10%/min. in the lowest temperature within a temperature range of normally 110 to 160° C., preferably 110 to 155° C. with respect to polypropylene; normally 70 to 120° C., preferably 70 to 110° C. with respect to high-density polyethylene; or normally 150 to 205° C., preferably 150 to 195° C. with respect to poly (4-methylpentene-1).

The strain rate of less than 10%/min. means the upper limit of the preferable strain rate in the lowest temperature within the temperature range, for example, at 110° C. with respect to polypropylene, and does not mean the upper limit of the preferable strain rate in a temperature higher than the lowest temperature. Namely, a high-molecular material is viscoelastic body and its stretching behavior depends upon the time-temperature superposition principle. Therefore, the small strain rate in a low temperature is equivalent to the large strain rate in a high temperature. This means, for instance, that the strain rate corresponding to the strain rate of 10%/min. at 110° C. with respect to polypropylene is larger than 10%/min. in a temperature higher than 110° C.

If stretching is effected at a temperature outside of the aforesaid temperature range, the following problems will be experienced. In the case of a temperature which is lower than the aforesaid temperature range, film having a small pore size can only be obtained. Moreover, film may break off at a portion whose percentage of stretching is small, and film of low porosity can only be obtained.

On the other hand, if the stretching temperature is higher than the aforesaid temperature range, both the film thickness and the film width perpendicular to the direction of film stretching may be reduced. Alternatively, the polyolefin may melt or partially melt, so that no pore is formed or small-diameter pores are only obtained.

If the strain rate is larger than a strain rate corresponding to a strain rate of less than 10%/min. in the lowest temperature within the temperature range, film having small-diameter pores only may be obtained or no pores may be formed.

If the strain rate is less than a strain rate corresponding to a strain rate of less than 10%/min. in the lowest temperature within the temperature range, as the percentage of stretching is increased, the average pore size and the porosity will increase.

The percentage of stretching can be altered in accordance with the average pore size corresponding to the desired use of a selected polyolefin microporous film, for example, a porous polypropylene film. The percentage of stretching is set to 100–700%, preferably 150–600% with respect to the initial length of the unstretched polyolefin film. If the percentage of stretching exceeds 700%, the film may break off.

The polyolefin film which has been made porous through the aforesaid stretching step is then preferably subjected to heat treatment. The primary object of this heat treatment is to thermally fix the film so as to retain the fine pores thus formed. This heat treatment is implemented by utilizing a method of heating the porous polyolefin film in air at a temperature 5–60° C. lower than the melting temperature of the polyolefin employed for 3 seconds or more while maintaining the stretched state thereof. Specific examples of the heating temperature are: with respect to polypropylene, normally 100–165° C., preferably 130–155° C.; with respect to high-density polyethylene, normally 70–125° C., preferably 80–120° C.; and with respect to poly (4-methylpentene-1), normally 150–210° C., preferably 160–200° C.

If the heating temperature of a particular material is remarkably higher than the upper limit of the temperature described above, the formed fine pores may be closed. If the heating temperature is remarkably lower than the lower limit, or if the heating period is shorter than 3 seconds, insufficient heat fixation results and the formed pores may be closed at a later time. Moreover, the film may be susceptible to heat shrinkage due to temperature changes during use.

The polyolefin microporous film which was prepared by stretching, by each of methods 1) and 2), the polyolefin film having the aforesaid crystallinity, the small angle X-ray scattering pattern, the half-value width of the degree of diffraction and a long period were observed with a scanning electron microscope. It was found that the polyolefin microporous film was made up of: groups of unstretched planar flat portions which ran at approximately constant intervals in the direction perpendicular to the direction in which the film was stretched and which were formed approximately parallel to a cross section perpendicular to the direction in which the film was stretched; and groups of relatively slender fibrils which ran in the gap between adjacent planar flat portions at approximately constant intervals and approximately in parallel with the direction in which the film was stretched. It was further found that a multiplicity of fine pores were formed, each of which had an approximately uniform configuration in which the intervals between the slender fibrils connecting adjacent planar flat portions extended approximately two-dimensionally. In addition, a majority of the fine pores were through-pores and had approximately uniform pore sizes. The film having such a distinct structure is of course suitable for use as a separating membrane for water filtration, plasma separation or the like, and is extremely suitable for use as a battery separator as well.

EXAMPLES

The present invention will be explained more specifically with reference to examples and comparative examples, but the following examples are not intended to limit the scope of the present invention.

Incidentally, the permeability illustrated in each of the following examples and comparative examples was obtained through the steps of imparting hydrophilic properties to the porous film in accordance with a method described in ASTM-F317, setting the hydrophilic porous film in a predetermined holder, applying pressure to one side of the film in the direction of the thickness thereof, and measuring the quantity of water passed per unit time through the film from the pressed side to the other side.

Examples 1 to 4 and comparative examples 1 and 2 relate to the microporous film according to the present invention, and examples 5 to 10 and comparative examples 3 and 4 relate to a battery separator using a porous polypropylene film of the present invention.

EXAMPLE 1

Polypropylene (brandname: UBE-PP-F109K made by Ube Industries, Ltd. MFI=9 g/10 min.,) was formed into an inflation film by using an inflation molder provided with a die having an outer diameter of 150 mm under the conditions of a delivery temperature of 190° C. and a take-up speed of 30 m/min. The polypropylene film thus obtained was heated for 30 minutes in a heated air oven held at 145° C., thereby preparing an unstretched polypropylene film of the type whose crystallinity was 70% and whose diffraction images obtained by small angle X-ray scattering were two-point figures each having an approximately circular form, the half-value width of the degree of diffraction being 10' with the long period thereof 211 Å.

This unstretched film was stretched in liquid nitrogen (−196° C.) by 20% with respect to the initial length. Subsequently, the film was subjected to heat fixation for 2 minutes in a heated air oven held at 145° C. with the stretched state maintained.

After this film was subjected to hot stretching by 300% in an atmosphere of air at 130° C., it was further subjected to heat fixation for 30 minutes in a heated air oven held at 145° C., thereby producing the polypropylene microporous film.

Figure 2:
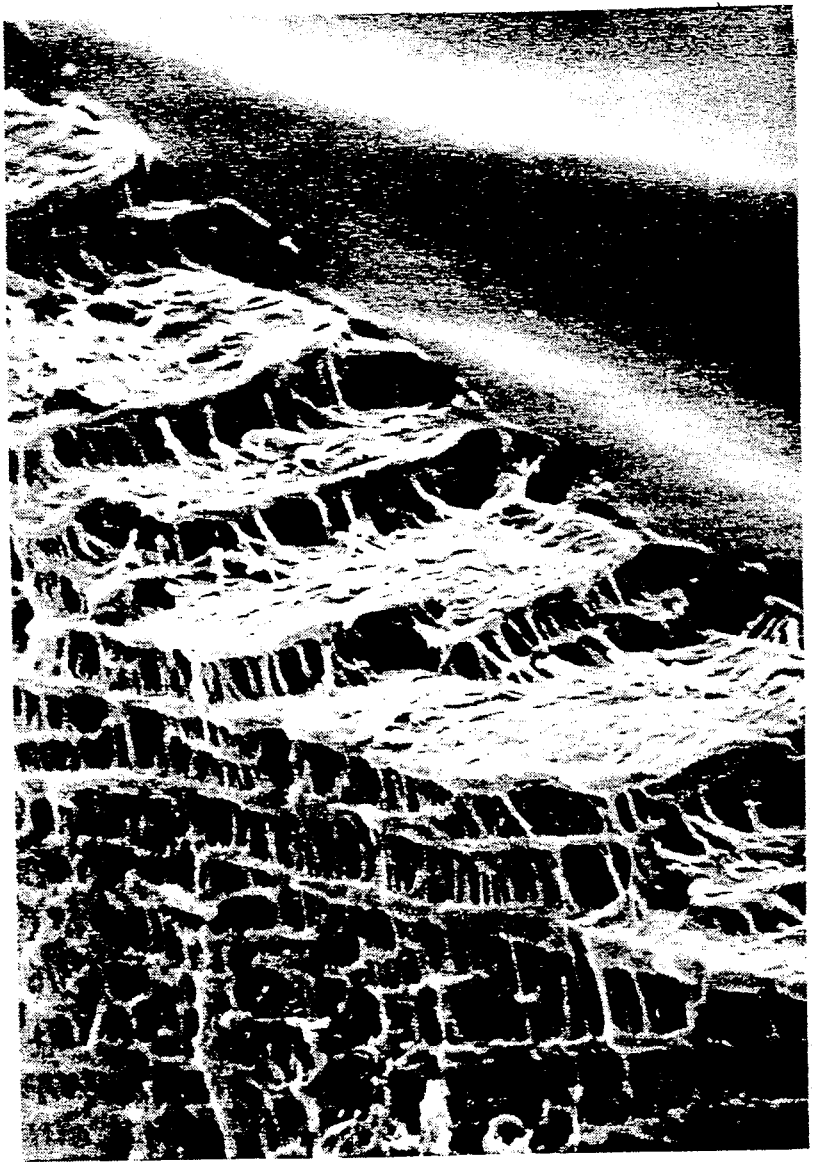
FIG. 2 is an scanning electron micrograph illustrating the surface of a microporous film and the configuration of fine fibrils on a cross section of the same.

When the average pore size ($D_A$) and the maximum pore size ($D_M$) of the polypropylene microporous film thus obtained were measured by a half-dry method employing ethanol which is based on the method in ASTM F316-30, it was found that the average pore size and the $D_A/D_M$ ratio were 0.13 μm and 0.85, respectively. When the porosity was measured by a method of charging mercury by pressure by means of Porosimetro Series 1500 manufactured by Carloerba Company, Italy, it was found to be 71.0%. When the tensile elastic modulus in the stretching direction was measured in accordance with the method described in ASTM D882, it was found to be 7,700 kg/cm$^2$. The water filtration rate of the film to which hydrophilic properties were imparted with ethanol was 30.0 λ/m$^2$×min.×kg/cm$^2$. When the surface and the cross section of this polypropylene microporous film were observed with a scanning electron microscope (X-605 manufactured by Hitachi, Ltd.), it was found that the polypropylene microporous film comprised groups of planar flat portions which were formed approximately perpendicularly to the direction in which the film was stretched and groups of fine fibrils which were formed approximately parallel to each other in the direction in which the film was stretched, these two groups forming a multiplicity of fine through-pores which extended approximately two-dimensionally. The electron micrographs of the surface and the cross section of the thus-obtained polypropylene microporous film are shown in FIG. 1 (a magnification of 12,400X) and FIG. 2 (a magnification of 4,500X), respectively. Incidentally, the half-dry method, Porosimetro Series 1500, the method described in ASTM D882 and the scanning electron microscope (X-605) are similarly employed in each of the following examples.

COMPARATIVE EXAMPLE 1

The same polypropylene as that used in Example 1 was employed to prepare an unstretched polypropylene film of the type whose crystallinity was 40 % and whose diffraction images obtained by small angle X-ray scattering were two-point figures each having an elliptical form, the half-value width of the degree of diffraction in the short axis of each of the ellipses being 20' with the long period thereof 165 Å.

This unstretched film was subjected to stretching and heat fixation steps similar those used in Example 1, thereby producing the polypropylene microporous film.

When the surface and the cross section of this polypropylene microporous film were observed with the scanning electron microscope, neither groups of planar flat portions which were formed approximately perpendicularly to the direction in which the film was stretched nor a multiplicity of fine through-pores of uniform size and configuration were observed. The pores appearing at the surface and the cross section were not uniform in size or configuration, and portions which formed the walls between the fibrils were present in a meandering manner to form closed circuits of various sizes. No through-pores which extended two-dimensionally were observed.

EXAMPLE 2

The polypropylene film formed under the same conditions as those used in Example 1 was subjected to heat treatment for 20 minutes in a heated air oven held at 140° C. to prepare an unstretched polypropylene film of the type whose crystallinity was 68% and whose diffraction images obtained by small angle X-ray scattering were two-point figures each having an approximately circular form, the half-value width of the degree of diffraction being 11' with the long period thereof 200 Å.

This unstretched film was stretched by 300% with respect to the initial length at a temperature of 145° C. and a strain rate of 8.33%/min, and was then subjected to heat fixation for 10 minutes in a heated air oven held at 145° C. with the stretched state maintained, thereby producing the polypropylene microporous film.

When the surface and the cross section of this polypropylene microporous film were observed with the scanning electron microscope, a structure similar to that of the film obtained in Example 1 was observed.

COMPARATIVE EXAMPLE 2

The same polypropylene as that used in Example 1 was employed to produce a polypropylene microporous film by stretching under the same conditions except that stretching in air (25° C.) was substituted for stretching in liquid nitrogen.

Although the unstretched polypropylene film was identical to that used in Example 1, the average pore size, the porosity, the $D_A/D_M$ ratio, the elastic modulus and the water filtration rate of the obtained microporous film exhibited the respective values lower than those of the porous polypropylene film obtained in Example 1. Moreover, when the surface and the cross section of this polypropylene microporous film were observed with the scanning electron microscope, the number of pores which extended from one to the other surface was small compared to the film obtained in Example 1.

EXAMPLE 3

The same polypropylene film as that used in Example 1 was processed in a manner similar to that used in Example 1 except that stretching was conducted in argon held at −180° C.0

When the surface and the cross section of this polypropylene microporous film were observed with the scanning electron microscope, a structure similar to that of the film obtained in Example 1 was observed.

EXAMPLE 4

The same polypropylene film as that used in Example 1 was stretched by 20% with respect to the initial length in liquid nitrogen (−196° C.), and was then subjected to heat fixation for 2 minutes in a heated air oven held at 145° C. with the stretched state maintained, and this stretching and the following heat fixation were repeated five times.

When the surface and the cross section of this polypropylene microporous film were observed with the scanning electron microscope, a structure similar to that of the film obtained in Example 1 was observed.

The characteristics of the respective films obtained in examples 2 to 4 and comparative examples 1 and 2 are shown in Table 1.

TABLE 1

|  | Example 2 | Example 3 | Example 4 | Comparative example 1 | Comparative example 2 |
|---|---|---|---|---|---|
| Film thickness (μm) | 25 | 26 | 25 | 25 | 27 |
| Average pore diameter (μm) | 0.20 | 0.11 | 0.30 | 0.03 | 0.07 |
| $D_A/D_M$ | 0.83 | 0.92 | 0.71 | 0.43 | 0.40 |
| Porosity (%) | 73.1 | 69 | 72 | 21 | 28 |
| Elastic modulus (kg/cm²) | 7300 | 7400 | 6900 | 3800 | 4600 |
| Water filtration rate (l/m² · min · kg/cm²) | 43.0 | 19.1 | 78.5 | 1.1 | 2.3 |

EXAMPLE 5

An unstretched polypropylene film was formed by means of an inflation molder provided with an inflation forming die having a diameter of 50 mm and a slit gap of 0.7 mm. Forming was effected by a method comprising the steps of delivering polypropylene at a resin delivery temperature of 210° C. while blowing air at room temperature into a valve at a blow ratio of 0.7, then blowing air onto the outer wall surface of the delivered film at a location 5 cm above the die for cooling purposes, and then taking up it with a nip roll at a take-up speed of 36 m/min. at a location 1.8 m above the die, thereby producing the desired unstretched polypropylene film.

The polypropylene employed were as follows.

Polypropylene : Ube-PP-Y101J (manufactured by Ube Industries, Ltd.) MFI=1 g/10min.

The thickness of the thus-obtained unstretched film was 10 μm. The elastic recovery of this film from a 50% stretched state was 80%.

The obtained film was subjected to heat treatment for 10 minutes at 145° C. with no tension applied thereto. The elastic recovery of the obtained film was improved to 87%.

The crystallinity of the obtained film was 68% and the diffraction images obtained by small angle X-ray scattering were two-point figures each having an approximately circular form, the half-value width of the degree of diffraction being 11' with the long period thereof 135 Å.

This unstretched film was stretched in liquid nitrogen (−196° C.) by 10% with respect to the initial length. Subsequently, the film was subjected to heat fixation for 10 minutes in a heated air oven held at 145° C. with the stretched state maintained. After the heat fixation, the film was further stretched by 180% with respect to the length provided by the stretching in the liquid nitrogen. Subsequently, the film was subjected to heat fixation for 10 minutes in a heated air oven held at 145° C. with the stretched state maintained, thereby producing the polypropylene microporous film.

When the average pore size of the polypropylene microporous film thus obtained was measured by a half-dry method employing ethanol which was based on the method described in ASTM F316-80, it was found to be 0.13 μm. When the porosity was measured by a method of charging mercury by pressure (by means of Porosimetro Series 1500 manufactured by Carloerba Company, Italy), it was found to be 54.60%. The water filtration rate was 23.18 $\lambda/m^2 \times min. \times kg/cm^2$.

When the surface and the cross section of this porous polypropylene film were observed with a scanning electron microscope, it was found that the polyolefin was made up of groups of unstretched planar flat portions which ran at approximately constant intervals in the direction perpendicular to the direction in which the film was stretched and which were formed approximately parallel to a cross section perpendicular to the direction in which the film was stretched, and groups of relatively slender fibrils which ran in the gap between adjacent planar flat portions at approximately constant intervals and approximately in parallel with the direction in which the film was stretched. It was further found that a multiplicity of fine pores were formed, each of which had an approximately uniform configuration in which the intervals between the slender fibrils connecting adjacent planar flat portions extended approximately two-dimensionally. In addition, when the cross section of the film was observed, a majority of the formed fine pores were pores which extended from one surface to the other surface.

The results of measurement of the electrical conductivity of this film are shown in Table 2.

Incidentally, the above half-dry method was also employed in the following examples.

COMPARATIVE EXAMPLE 3

The same polypropylene film as that used in Example 5 was employed to produce a polypropylene microporous film by stretching under the same conditions except that stretching in air (25° C.) was substituted for stretching in liquid nitrogen.

When the average pore size of the polypropylene finely porous film thus obtained was measured by a half-dry method, it was found that the average pore size was 0.07 μm. When the porosity was measured by means of a method of charging mercury under pressure, it was found to be 41.50%. The water filtration rate was 6.66 $\lambda/m^2 \times min. \times kg/cm^2$.

Although the unstretched polypropylene film was identical to that used in Example 5, the average pore size, the porosity, and the water filtration rate of the obtained porous film exhibited values lower than those of the porous polypropylene film obtained in Example 5. Moreover, when the surface and the cross section of the porous polypropylene film obtained were observed with a scanning electron microscope, the number of pores which extended from one to the other surface was small compared to the film obtained in Example 5. The results of measurement of the electrical conductivity of this film is shown in Table 2.

EXAMPLE 6

An unstretched film was formed by using an apparatus similar to that used in Example 5. The polypropylene employed and the forming conditions are as follows.

Polypropylene UBE-PP-J130G (manufactured by Ube Industries, Ltd.) MFI=30 g/10 min.
Resin delivery temperature: 170° C.
Take-up speed: 36 m/min.
Blow ratio: 0.70

The thickness of the thus-obtained unstretched film was 20 μm. The elastic recovery of this film from a 50% stretched state was 30%.

The obtained film was subjected to heat treatment for 10 minutes at 145° C. with no tension applied thereto. The elastic recovery of the obtained film was improved to 72%.

This unstretched film was subjected to stretching in liquid nitrogen and heat fixation in a heated air oven in a manner similar to that carried out in Example 5.

This film was stretched by 330% with respect to the length provided by stretching in the liquid nitrogen, in a heated air oven held at 145° C., and was then subjected to heat fixation for 10 minutes in a heated air oven held at 145° C. with the stretched state maintained, thereby producing a porous polypropylene film.

When the average pore size of the porous polypropylene film thus obtained was measured by the half-dry method, it was found to be 0.70 μm. When the porosity was measured with a mercury porosimeter, it was found to be 65.30%. The water filtration rate was 59.00 $\lambda/m^2 \times min. \times kg/cm^2$.

When the surface and the cross section of the porous polypropylene film obtained were observed with the scanning electron microscope, the pores were substantially uniformly distributed over the surface of the film and the pore size was substantially uniform over the entire film. When the cross section of this film was observed with the scanning electron microscope, a majority of the formed pores were pores which extended from one to the other surface. The results of measurement of the electrical conductivity of this film are shown in Table 2.

EXAMPLE 7

Polypropylene (brandname: UBE-PP-F109K made by Ube Industries, Ltd. MFI=9 g/10min.,) was formed into an unstretched polypropylene film by means of an inflation molder provided with an inflation forming die having a diameter of 50 mm and slit gap of 0.7 mm. Forming was effected by a method comprising the steps of delivering polypropylene at a resin delivery temperature of 200° C. while blowing air into a valve at a blow ratio of 0.7, then blowing air at room temperature onto the outer wall surface of the delivered film at a location 5 cm above the die for cooling purposes, and then taking up it with a nip roll at a take-up speed of 36 m/min. at a location 1.8 m above the die, thereby producing the desired unstretched polypropylene film.

The thickness of the thus-obtained unstretched film was 20 μm. The elastic recovery of this film from a 50% stretched state was 38%.

The obtained film was subjected to heat treatment for 10 minutes at 145° C. with no tension applied thereto.

The elastic recovery of the obtained film was improved to 85%.

This unstretched film was stretched by 300% with respect to the initial length at a temperature of 145° C. at a strain rate of 8.33%/min. Subsequently, the film was subjected to heat fixation for 10 minutes in a heated air oven held at 145° C. with the stretched state maintained, thereby producing the polypropylene microporous film.

When the average pore size and the porosity of this film were measured by the same method as that used in Example 5, they were found to be 0.4 μm and 67%, respectively. The results of measurement of the electrical conductivity of this film are shown in Table 2.

TABLE 2

| | Measurement of Electrical Conductivity | |
|---|---|---|
| | Porosity (%) | Electrical conductivity (S/cm) |
| Example 5 | 54.6 | $5.10 \times 10^{-3}$ |
| Example 6 | 65.3 | $5.16 \times 10^{-3}$ |
| Example 7 | 67.0 | $5.21 \times 10^{-3}$ |
| Comparative example 3 | 41.5 | $2.48 \times 10^{-3}$ |

Method of measuring electrical conductivity

A porous polypropylene film was impregnated with a liquid electrolyte (an isovolumetric mixture solution of propylene carbonate and dimethoxyethane, in which a 1-mol concentration of lithium perchlorate was dissolved), and the electrical conductivity was measured with a conductivity meter.

EXAMPLE 8

A metallic lithium disk having a diameter of 16 mm and a thickness of 0.75 mm was prepared as the anode. For the cathode, 68 mg of manganese dioxide, 8.5 mg of acetylene black and, as a binder, 8.5 mg of Teflon powder (Luflon L-5 manufactured by Daikin Kogyo Co., Ltd.) were mixed, and the mixture was formed under a pressure of 7.5 ton/cm². Subsequently, the thus-formed mixture was subjected to heat treatment at 300° C., thereby preparing an anode layer having a diameter of 13 mm and a thickness of 1.3 mm.

As a porous polypropylene film, the film produced in Example 5 was employed.

This porous polypropylene film was impregnated with a liquid electrolyte (an isovolumetric mixture solution of propylene carbonate and dimethoxyethane, in which a 1-mol concentration of lithium perchlorate was dissolved), and the film thus obtained was sandwiched between the anode and cathode to prepare a battery.

As a battery performance test, a 2.8 kΩ constant-resistance discharge test was performed to obtain a battery capacity of 16 mAh with a 2.0-volt cut.

COMPARATIVE EXAMPLE 4

The film produced in Comparative Example 3 was employed to prepare a lithium battery in a manner similar to that used in Example 8. When a battery performance test similar to that in Example 8 was conducted, the discharge capacity was found to be 52 mAh.

EXAMPLE 9

The film produced in Example 6 was employed to prepare a lithium battery in a manner similar to that used in Example 8. When a battery performance test similar to that in Example 8 was conducted, the discharge capacity was found to be 16 mAh.

EXAMPLE 10

The film produced in Example 7 was employed to prepare a lithium battery in a manner similar to that used in Example 8. When a battery performance test similar to that in Example 8 was conducted, the discharge capacity was found to be 17 mAh.

The microporous film of the present invention comprises through-pores of uniform size and configuration which are formed approximately perpendicularly to the direction of film stretching and, in addition, the porosity is high. Accordingly, the film can yield both satisfactory water filtration rate and selective separating capabilities. Accordingly, it is possible to provide a microfilter having excellent filtration performance which can be adapted to various applications not only in the field of water treatment, air purification or the like, but in the field of plasma separation, particularly such as separators for use in donation plasmapheresis. Moreover, the above-described characteristics of the porous film of the present invention make it possible to extremely suitably adapt the film to applications in a battery separator.

For example, by using the porous film of the present invention, it is possible to provide a battery separator in which a majority of pores are through-pores and have approximately uniform pore sizes and which excels in characteristics such as ionic conductivity by virtue of the presence of fine pores of a unique form which yields a porosity of 45% or more. Accordingly, by using this battery separator, it is possible to provide a lithium battery having excellent battery performance.

What is claimed is:

1. A microporous film having a multiplicity of fine through-pores obtained by stretching a polyolefin film, comprising:

groups of unstretched planar flat portions which run at approximately constant intervals in the direction perpendicular to the direction in which the film is stretched and which are formed approximately parallel to a cross section perpendicular to the direction in which said film is stretched; and groups of relatively slender fibrils which run in the gap between adjacent planar flat portions at approximately constant intervals and approximately in parallel with the direction in which said film is stretched, both groups being combined to define a multiplicity of fine pores each of which has an approximately uniform configuration, wherein combinations of said fine pores form through-pores which extend from one surface of the film to another surface of the film in an approximately rectilinear path.

2. A separator for use in a battery made from said microporous film according to claim 1, wherein said polyolefin film is a porous polypropylene film in which a majority of pores constitute through-pores and have approximately uniform pore sizes, the porosity of said film being not lower than 45%.

3. A lithium battery employing said battery separator according to claim 2.

* * * * *